US012589513B2

(12) United States Patent
González

(10) Patent No.: US 12,589,513 B2
(45) Date of Patent: Mar. 31, 2026

(54) MACHINE FOR CUTTING DECORATIONS FOR FRUSTOCONICAL BODIES

(71) Applicant: INDUSTRIAS TECNOLÓGICAS DE MECANIZACIÓN Y AUTOMATIZACIÓN, S.A., Sant Just Desvern (ES)

(72) Inventor: Manuel González, Sant Just Desvern (ES)

(73) Assignee: INDUSTRIAS TECNOLÓGICAS DE MECANIZACIÓN Y AUTOMATIZACIÓN, S.A., Sant Just Desvern (ES)

(*) Notice: Subject to any disclaimer, the term of this patent is extended or adjusted under 35 U.S.C. 154(b) by 255 days.

(21) Appl. No.: 17/538,695

(22) Filed: Nov. 30, 2021

(65) Prior Publication Data

US 2022/0193940 A1 Jun. 23, 2022

(30) Foreign Application Priority Data

Dec. 23, 2020 (EP) .................................... 20383151

(51) Int. Cl.
*B26D 3/10* (2006.01)
*B26D 1/06* (2006.01)
*B26D 5/08* (2006.01)
*B26D 11/00* (2006.01)

(52) U.S. Cl.
CPC ............... *B26D 3/10* (2013.01); *B26D 1/065* (2013.01); *B26D 5/086* (2013.01); *B26D 11/00* (2013.01)

(58) Field of Classification Search
CPC ........ B26D 11/00; B26D 5/086; B26D 1/065; B26D 3/10
See application file for complete search history.

(56) References Cited

U.S. PATENT DOCUMENTS 329,818 A * 11/1885 Covert .................. B26D 1/626 83/397
3,594,904 A * 7/1971 Wright .................. B21D 28/34 30/360

(Continued)

FOREIGN PATENT DOCUMENTS

JP 2000106734 * 4/2000
JP 201015537 A * 7/2010

*Primary Examiner* — Liang Dong
(74) *Attorney, Agent, or Firm* — Hodgson Russ LLP

(57) ABSTRACT

The present invention relates to a machine for cutting decorations for frustoconical bodies, for cutting printed strips wherein arch-shaped decorations and disposable trapezoidal portions are alternated. The machine comprises two longitudinal supports mounted on clamping pieces and carriers of respective groups of counter blades; and two independent groups of blades attached to the respective groups of counter blades and defining a gap between them of increasing width towards a lower gravity outlet opening of the trapezoidal portions separated by cutting. The blades of each group are fixed to respective drive shafts mounted in holes in the longitudinal supports and fixed to a common plate driven by a cylinder. The clamping parts of the longitudinal supports and the common plate are exchangeable for others that provide different inclinations and separations of the groups of blades and counter blades.

11 Claims, 4 Drawing Sheets

(56) References Cited

U.S. PATENT DOCUMENTS

| | | | | | |
|---|---|---|---|---|---|
| 4,733,552 | A * | 3/1988 | Lefils | B21D 37/02 | 72/472 |
| 6,112,413 | A * | 9/2000 | Frakes | B26D 1/305 | 30/229 |
| 7,428,859 | B2 * | 9/2008 | Fujita | B26D 7/22 | 83/466 |

* cited by examiner

MACHINE FOR CUTTING DECORATIONS FOR FRUSTOCONICAL BODIES

CROSS REFERENCE

The present application claims priority to European Patent Application No. 20383151.6, filed Dec. 23, 2020, the entire disclosure of which is incorporated herein by reference.

TECHNICAL FIELD

The present invention relates to a machine applicable in the sector dedicated to the decoration of frustoconical-shaped bodies, and preferably, although not limited to, the decoration of frustoconical containers.

BACKGROUND

In different sectors, it is common to use products or containers with a frustoconical shape, and to place around them decorations obtained from the die-cutting of a printed strip wherein arch-shaped decorations and disposable trapezoidal portions are alternated.

A current problem is the excessive triangular overlap of the ends of the decoration once placed on the frustoconical container, since said overlap or layering is not aesthetic.

Patent EP 2196293 describes a machine for cutting decorative elements intended for being fixed on frustoconical elements, which comprises at least one cutting station provided with a casing that extends over a longitudinal axis that houses cutting means and a counter blade, the casing and the counter-blade having at least one through slot, substantially perpendicular to the longitudinal axis, for the passage of a continuous, printed strip, which has decorations alternated with trapezoidal portions to be removed by cutting.

In said background, the cutting means and the counter blade are capable of relative movement in the longitudinal direction for cutting the trapezoidal portions existing between the successive decorations.

To perform the simultaneous cutting of the ends of the trapezoidal portion to be removed, in said background the counter blade exhibits a triangular prismatic shape that covers the existing space between the cutting means, which favours that the cut trapezoidal portions remain inside the aforementioned counter blade, the incorporation in the lower area of said counter blades of an extraction tool that grips the cut trapezoidal portions and moves them away from the cutting station being necessary for the extraction thereof.

This solution, in addition to being mechanically complex and making the manufacturing of the cutting machine more expensive, prevents direct access to the cutting area, increases the risk of jamming of the trapezoidal portions and the difficulty in solving these jams in the event that they occur.

Another drawback of the machine described in said background is the lack of versatility thereof, since the arrangement of the cutting means and the prismatic shape of the counter blades prevents it from being adapted, by modifying a reduced number of parts, for cutting printed strips wherein the trapezoidal portions have different lengths or different angles at the ends thereof.

SUMMARY

The machine for cutting decorations for frustoconical bodies, object of this invention, exhibits some constructive features that simultaneously ensure the fall by gravity of the cut trapezoidal portions from the printed strip, making the use of extraction tools for said trapezoidal portions unnecessary, and preventing them from jamming inside the machine; and moreover, to enable the machine to be adapted for cutting trapezoidal portions of different widths and inclinations at the ends thereof by replacing a reduced number of parts.

According to the invention, this machine for cutting decorations comprises: two longitudinal supports provided with inner surfaces facing each other, divergent towards the lower area, and carriers of respective groups of blade-holders; cutting blades; drive means for the relative movement of the blades and counter blades in the longitudinal direction, and transverse slots, open at the top, for the controlled passage of respective printed strips wherein arch-shaped decorations and disposable trapezoidal portions to be removed by means of cutting are alternated.

According to the invention, this machine comprises two independent groups of flat and coplanar blades, laterally attached to the respective groups of counter blades of the longitudinal supports; said groups of blades defining a gap between them of increasing width towards a lower gravity outlet opening of the trapezoidal portions separated by cutting from the printed strip. The use of two independent groups of blades enables the gap between them to remain completely open and not to have any tool inside for gripping and extracting the trapezoidal portions, which could constitute the source of jamming of said portions inside the machine.

This machine comprises two drive shafts of the respective groups of blades, said drive shafts being housed in longitudinal holes defined in the respective longitudinal supports and fixed by one of the ends thereof to drive means which cause the movement of the blades with respect to the counter blades and consequently the cutting of the trapezoidal portions, which are defined between the consecutive decorations of the printed strips that move through the transverse slots defined in the longitudinal supports and in the counter blades.

The longitudinal supports are fixed by the opposite ends to clamping parts that determine the relative positions and the separation and inclination of said longitudinal supports.

The longitudinal drive means of the shafts comprise a common plate fixed to one of the ends of said shafts, and a pneumatic cylinder that acts on the aforementioned common plate and simultaneously causes the drive shafts and the respective groups of blades to move with respect to the counter blades.

According to the invention, the longitudinal supports comprise windows, elongated in the longitudinal direction, on the inner faces thereof, wherein means for fixing the blades of each group to the corresponding drive shaft are housed.

The features mentioned above, in addition to enabling the cut trapezoidal portions from the printed strip to simply fall by gravity towards the lower area, without any impediment, enable the machine to be adapted for cutting printed strips with intermediate portions of different widths and with ends of different inclinations, replacing the end clamping parts of the longitudinal supports and the common plate that relates the pneumatic cylinder with the drive axes of the blades being sufficient to do so.

In order to ensure that the blades remain laterally attached and in perfect contact with the respective counter blades, the machine comprises magnetic means that generate a force of attraction between said blades and counter blades. This ensures that the blades and the counter blades remain in contact regardless of the inclination of the longitudinal supports.

It should be mentioned that this machine may alternatively comprise, below the lower outlet opening of the cut trapezoidal portions: either an extraction channel connected to air suction or discharge means, or a container for collecting said portions.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
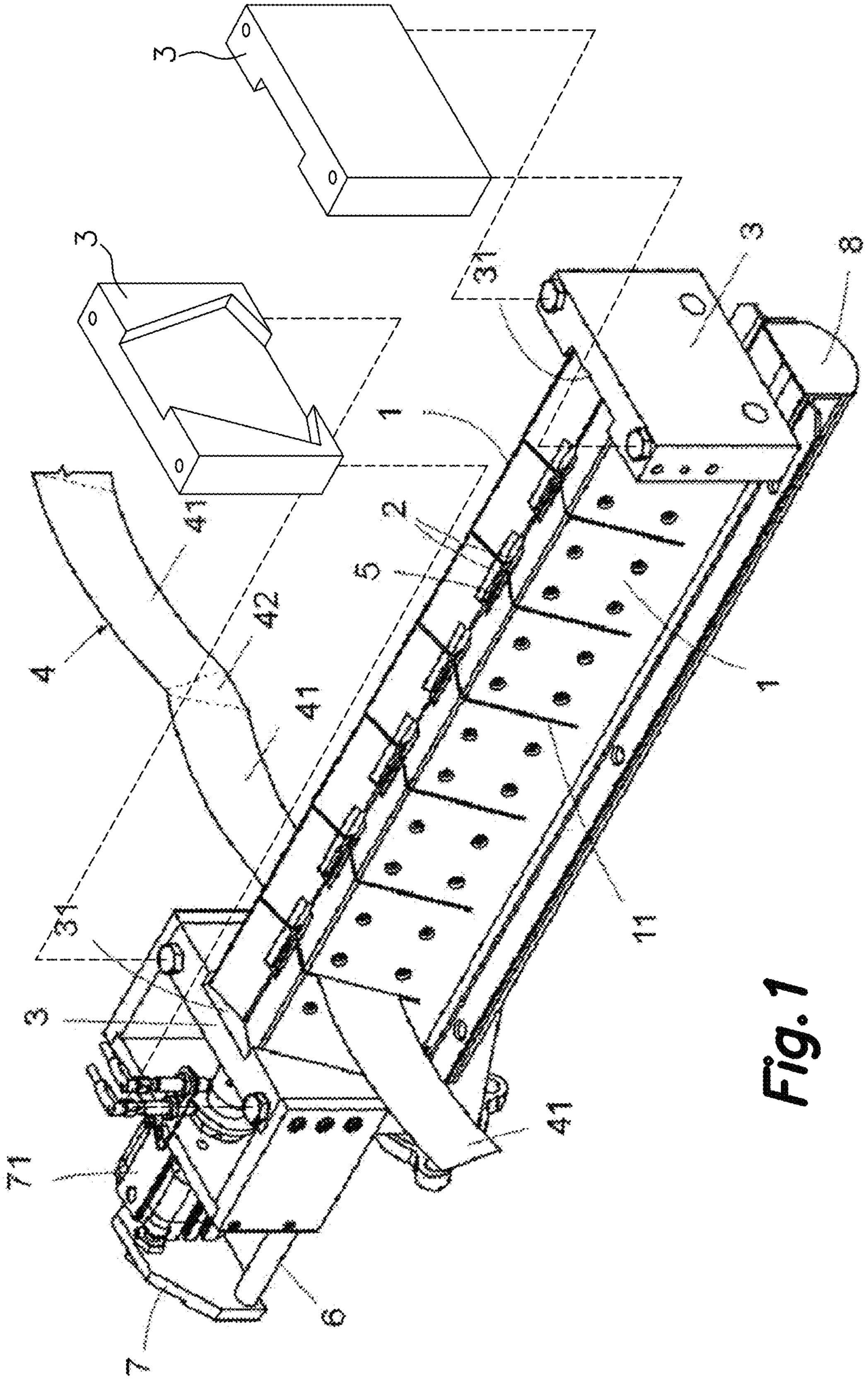
FIGS. 1 and 2 show respective perspective views of the machine for cutting decorations for frustoconical bodies according to the invention.

The cutting machine shown in the attached figures comprises two longitudinal supports (1) provided with inner surfaces, facing each other and diverging towards the lower area, wherein respective groups of counter blades (2) are mounted.

Said longitudinal supports (1) are fixed by the ends thereof to clamping parts (3) and comprise transverse slots (11) for the passage of printed strips (4) wherein arch-shaped decorations (41) and trapezoidal portions (42) to be removed by cutting at the opposite ends thereof are alternated, the decorations (41) intended for being incorporated being released into a mould for manufacturing frustoconical containers.

Figure 5:
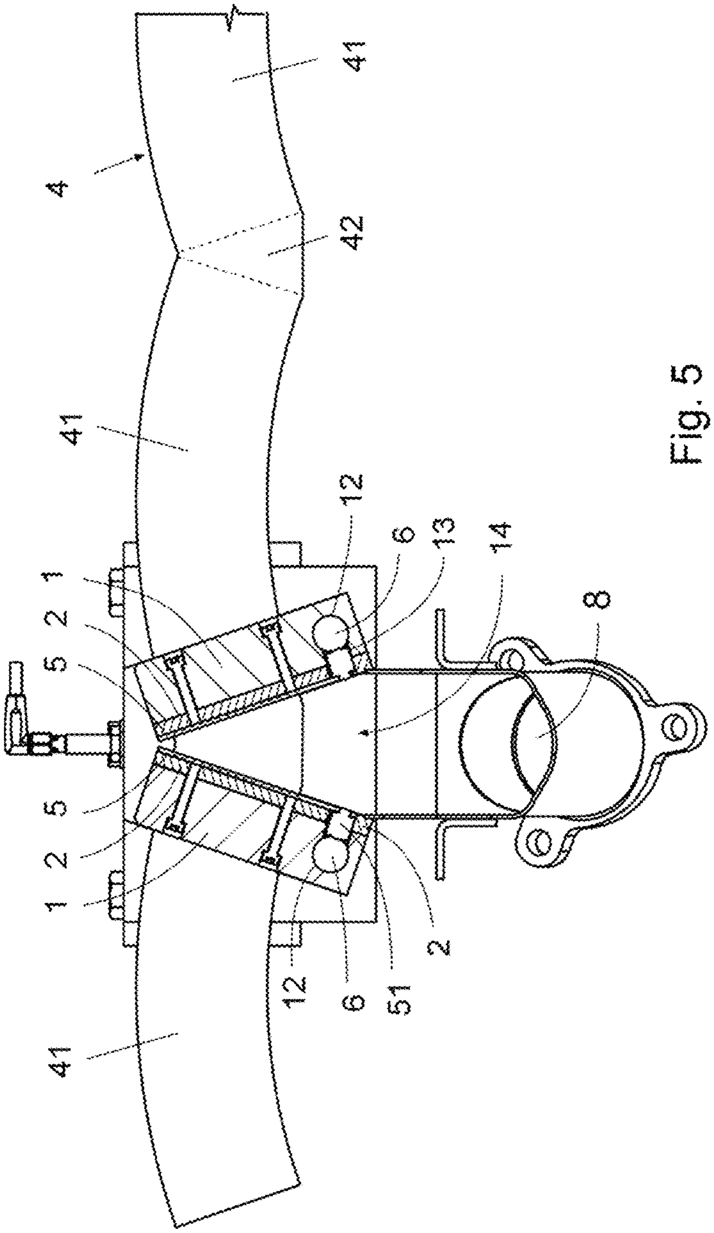
FIG. 5 shows a profile view of the cutting machine of the previous figures, cross-sectioned along the transverse plane B-B' marked in FIG. 3.

To perform this cutting, the machine comprises two independent groups of flat blades (5), arranged coplanarly, attached to the respective groups of counter blades (2) and fixed, as shown in FIG. 5, to drive shafts (6) housed capable of movement along longitudinal holes (12) defined in the longitudinal supports (1).

Figure 4:
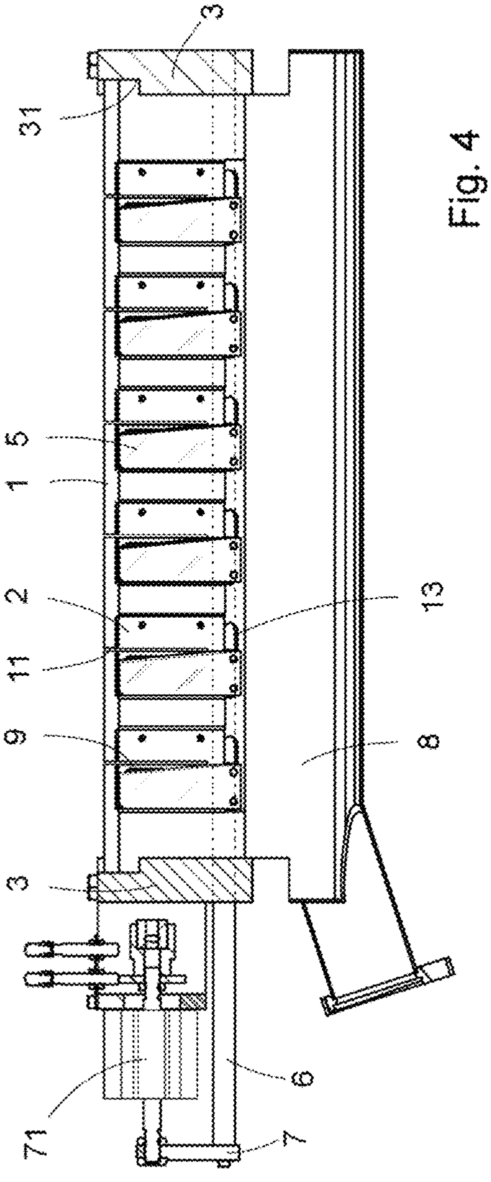
FIG. 4 shows an elevation view of the machine of the previous figures, longitudinally cross-sectioned along the plane A-A' marked in FIG. 3.

As can be seen in FIGS. 4 and 5, the longitudinal supports (1) exhibit windows (13) elongated in the longitudinal direction on the inner faces thereof, wherein means for fixing (51) the blades (5) to the corresponding drive shafts (6) are mounted. In an exemplary embodiment, said fixing means (51) comprise: a spacer arranged between the drive shaft (6) and the corresponding blade (5), and a tightening screw.

The drive shafts (6) are fixed by one of the ends thereof to a common plate (7) which moves longitudinally in one direction or the other by the action of a pneumatic cylinder (71) responsible for causing the longitudinal movement of the blades (5) with respect to the counter blades (2) and consequently the cut of the trapezoidal portions (42) of the printed strips (4) arranged between the two groups of blades (5), as shown in FIG. 5.

Figure 2:
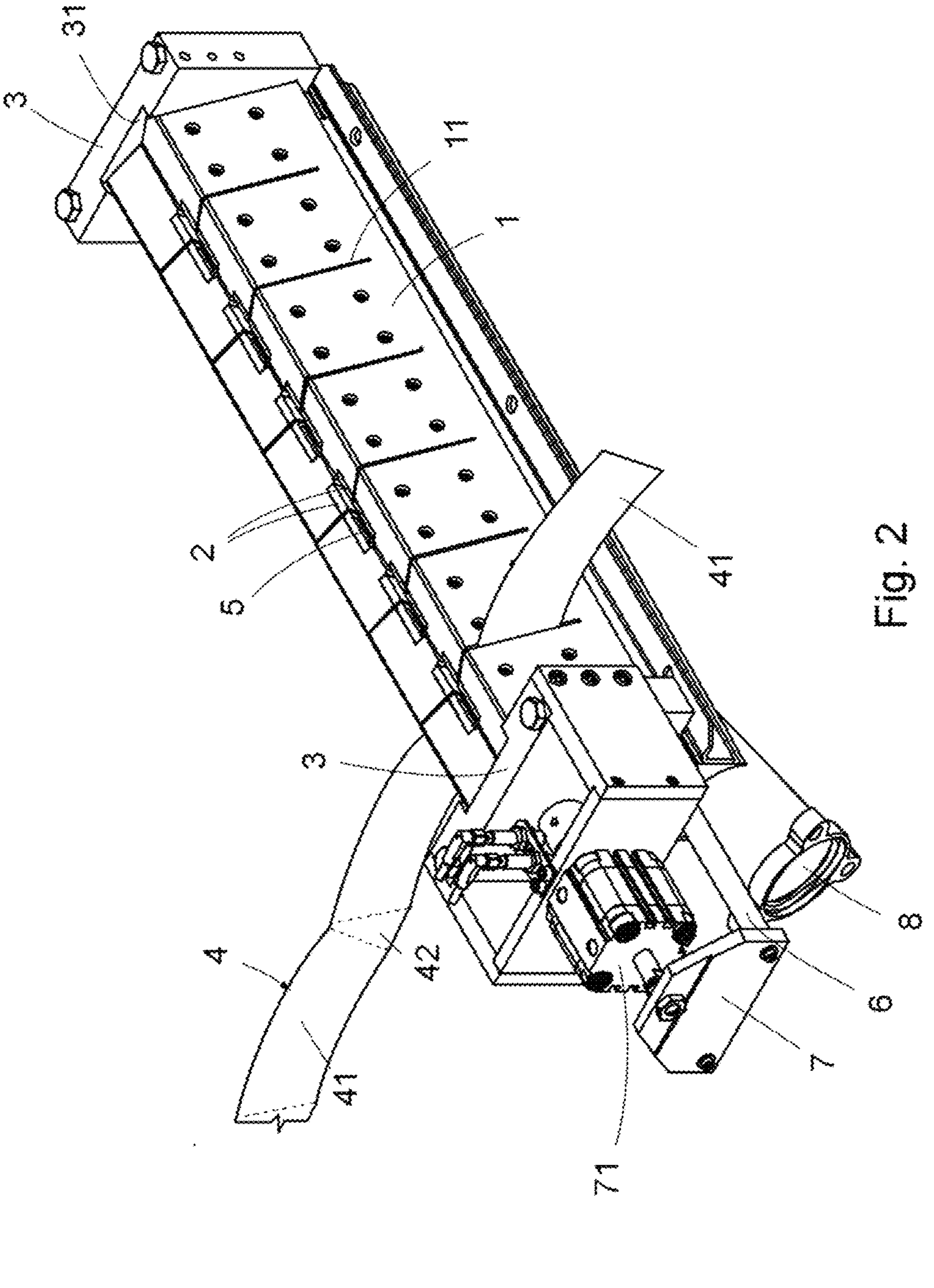
Figure 3:
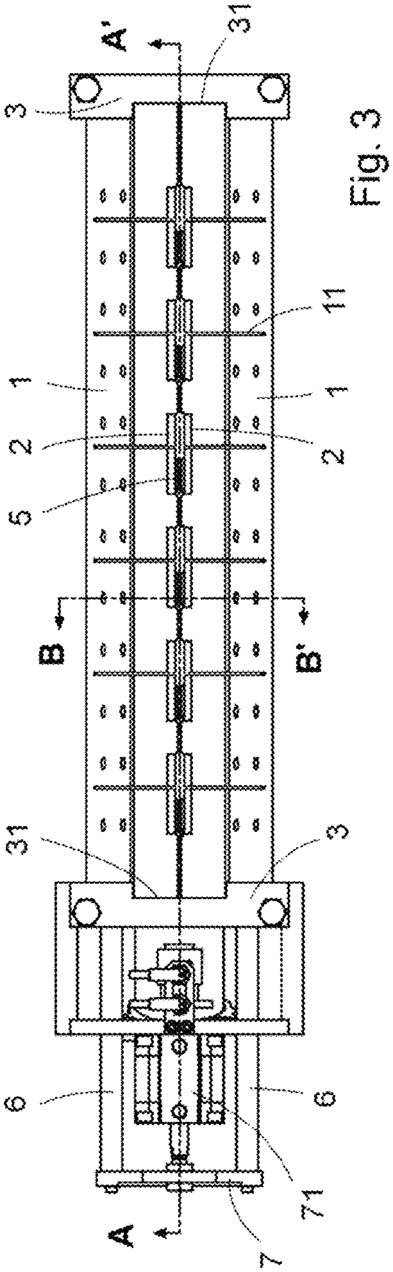
FIG. 3 shows a top plan view of the machine of the previous figures.

Although in FIGS. 1 and 2 a single printed strip (4) has been represented passing through one of the transverse slots (11), this machine can work simultaneously with several printed strips (4) arranged in respective transverse slots (11).

As shown in FIG. 5, the machine comprises a gap (14) between the two groups of blades (5) of increasing width towards a lower gravity outlet opening of those trapezoidal portions (42) separated from the decorations (41) during the cutting of the printed strip (4) by the blades (5).

A channel (8) is arranged below the lower opening of the gap (14) for extracting the trapezoidal portions (42), said channel (8) being connected to a duct (not shown) for air suction or discharge.

To ensure that the blades (5) remain in perfect contact with the counter blades (2), the machine incorporates magnetic means, represented in this case by magnets (9), which generate a magnetic force of attraction between said blades and counter blades.

In the example shown, the clamping parts (3) of the opposite ends of the longitudinal supports (1) are provided with seats (31) for housing said ends in a certain position, establishing a separation and an inclination of the counter blades (5) and of the corresponding blades (2), in accordance with the dimensions of the trapezoidal portions (42) of the printed strips to be cut in each case.

With the aforementioned features, the clamping parts (3) and common plate (7), responsible for relating the pneumatic cylinder (71) to the drive shafts (6) are replaceable and can be replaced by others to adapt the inclination and the separation of the two groups of blades (5) and counter blades (2) to the geometry of the trapezoidal portions (42) to be cut, thus enabling the machine to be adapted to the features of the printed strips (4) to be used in each case.

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. A machine for cutting decorations for frustoconical bodies, comprising:

left and right longitudinal supports having opposite inclinations, the left and right longitudinal supports provided with respective inner surfaces, the respective inner surfaces facing each other and diverging towards a lower area;

clamping parts to which the left and right longitudinal supports are fixed by opposite ends of the left and right longitudinal supports, each of the clamping parts of the left and right longitudinal supports comprising seats for housing the ends of the left and right longitudinal supports in a certain position;

left and right groups of counter blades fixedly mounted to said inner surfaces of said left and right longitudinal supports, respectively;

transverse slots defined in the left and right longitudinal supports for step by step advancement of at least one printed strip, the at least one printed strip including alternated arch-shaped decorations and disposable trapezoidal portions;

independent left and right groups of flat and coplanar cutting blades having respective left and right cutting blades, the left and right counter blades having respective left and right groups of counter blades, wherein the respective left and right cutting blades are laterally attached and overlapped to the respective left and right groups of counter blades, respectively;

wherein a gap is defined between said left and right cutting blades of the left and right groups of flat and coplanar cutting blades and between said left and right counter blades of the left and right groups of counter blades, said gap having an increasing width towards a lower gravity outlet opening of the disposable trapezoidal portions separated, by cutting, from the at least one printed strip;

left and right drive shafts housed in longitudinal holes defined in the left and right longitudinal supports, respectively, and capable of movement along the longitudinal holes, wherein the left and right cutting blades of the left and right groups of flat and coplanar cutting blades are fixed to the left and right drive shafts, respectively; and a drive to which the left and right drive shafts are fixed by one of its ends through a plate for reciprocating movement of the left and right cutting blades relative to the left and right counter blades in a longitudinal direction along the left and right longitudinal supports to cut the at least one printed strip into the alternated arch-shaped decorations and the disposable trapezoidal portions by step-by-step advancement of the at least one printed strip in one of the transverse slots after each reciprocating movement of the left and right cutting blades relative to the left and right counter blades, wherein shapes of the alternated arch-shaped decorations and the disposable trapezoidal portions are defined by inclination angles and a spacing distance of the left and right groups of flat and coplanar cutting blades and left and right groups of counter blades at the certain position of the left and right longitudinal supports fixed by the clamping parts;

wherein the clamping parts of the opposite ends of the left and right longitudinal supports comprise respective seats for housing each of the opposite ends of the left and right longitudinal supports in a certain position establishing a spacing distance and inclination of the left and right groups of flat and coplanar cutting blades and left and right groups of counter blades in accordance with the dimensions of the disposable trapezoidal portions of the at least one printed strip to be cut, wherein said clamping parts are replaceable for other clamping parts comprising respective seats for housing the opposite ends of the left and right longitudinal supports in different certain positions to adapt the spacing distance and inclination of the left and right groups of flat and coplanar cutting blades and left and right groups of counter blades to the geometry of the said disposable trapezoidal portions to be cut in each case by the reciprocating movement of the left and right cutting blades relative to the left and right counter blades, and wherein the plate connecting the drive shafts to the drive is replaceable for another plate in case of replacement of the clamping parts.

2. The machine according to claim 1, wherein the drive for driving the left and right drive shafts comprise a common plate fixed to one of the ends of said left and right drive shafts and a cylinder for simultaneous reciprocating movement of the left and right drive shafts and of the respective left and right groups of flat and coplanar cutting blades with respect to the left and right groups of counter blades.

3. The machine according to claim 2, wherein the left and right longitudinal supports comprise longitudinally elongated windows on the interfaces of the left and right longitudinal supports, wherein elements for fixing the left and right cutting blades of each left and right group of flat and coplanar cutting blades to a corresponding one of the left and right drive shafts are housed.

4. The machine according to claim 2, further comprising magnetic elements that generate a force of attraction between the left and right cutting blades and the left and right counter blades.

5. The machine according to claim 2, further comprising an extraction channel below the lower gravity outlet opening of the disposable trapezoidal portions connected to an air suction or discharge device.

6. The machine according to claim 1, wherein the left and right longitudinal supports comprise longitudinally elongated windows on the interfaces of the left and right longitudinal supports, wherein elements for fixing the left and right cutting blades of each left and right group of flat and coplanar cutting blades to a corresponding one of the left and right drive shafts are housed.

7. The machine according to claim 6, further comprising magnetic elements that generate a force of attraction between the left and right cutting blades and the left and right counter blades.

8. The machine according to claim 6, further comprising an extraction channel below the lower gravity outlet opening of the disposable trapezoidal portions connected to an air suction or discharge device.

9. The machine according to claim 1, further comprising magnetic elements that generate a force of attraction between the left and right cutting blades and the left and right counter blades.

10. The machine according to claim 1, further comprising an extraction channel below the lower gravity outlet opening of the disposable trapezoidal portions connected to an air suction or discharge device.

11. The machine according to claim 1, further comprising a collecting container below the lower gravity outlet opening for collecting the disposable trapezoidal portions.

* * * * *